(12) United States Patent
Tarbox et al.

(10) Patent No.: US 10,476,923 B2
(45) Date of Patent: Nov. 12, 2019

(54) FILTERING CONTENT FOR ADAPTIVE STREAMING

(71) Applicant: General Instrument Corporation, Horsham, PA (US)

(72) Inventors: Brian J. Tarbox, Littleton, MA (US); Robert E Mack, Collegeville, PA (US); Albert F. Elcock, West Chester, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 220 days.

(21) Appl. No.: 13/857,539

(22) Filed: Apr. 5, 2013

(65) Prior Publication Data

US 2014/0304373 A1 Oct. 9, 2014

(51) Int. Cl.
| | |
|---|---|
| G06F 15/16 | (2006.01) |
| H04L 29/06 | (2006.01) |
| H04N 21/262 | (2011.01) |
| H04N 21/2343 | (2011.01) |
| H04N 21/235 | (2011.01) |
| H04N 21/2668 | (2011.01) |
| H04N 21/845 | (2011.01) |

(52) U.S. Cl.
CPC ........... *H04L 65/60* (2013.01); *H04L 65/602* (2013.01); *H04L 65/605* (2013.01); *H04N 21/2358* (2013.01); *H04N 21/23439* (2013.01); *H04N 21/2668* (2013.01); *H04N 21/26258* (2013.01); *H04N 21/8456* (2013.01)

(58) Field of Classification Search
CPC ..... H04L 65/60; H04L 65/608; H04L 65/607; H04N 21/26258; H04N 21/25891; H04N 21/454; G11B 2020/10537; G11B 2020/1062; G11B 27/36
See application file for complete search history.

(56) References Cited

U.S. PATENT DOCUMENTS

| | | | |
|---|---|---|---|
| 6,075,550 A | 6/2000 | Lapierre | |
| 8,583,671 B2 * | 11/2013 | Martin et al. | 707/765 |
| 2003/0135857 A1 * | 7/2003 | Pendakur et al. | 725/61 |

(Continued)

FOREIGN PATENT DOCUMENTS

| | | |
|---|---|---|
| JP | 2008-204506 A | 9/2008 |
| KR | 10-2008-0109076 | 12/2008 |

(Continued)

OTHER PUBLICATIONS

B. Tarbox and R. Mack, "Complexity Considerations for Centralized Packaging vs. Remote Packaging", National Cable and Telecommunications Association (NCTA), 2012 Spring Technical Forum Proceedings, Boston, Massachusetts (May 2012).

(Continued)

*Primary Examiner* — Umar Cheema
*Assistant Examiner* — Anh Nguyen
(74) *Attorney, Agent, or Firm* — Stewart M. Wiener (57) ABSTRACT

Creating a filtered adaptive streaming playlist in a content delivery network. The playlist is for delivery of a plurality of chunks of stored video content to a streaming client device. The filtering is based on a determination of whether information associated with each chunk is in compliance with a personalized rule set associated with the streaming client device.

19 Claims, 3 Drawing Sheets

(56) References Cited

U.S. PATENT DOCUMENTS

| | | | |
|---|---|---|---|
| 2005/0071888 A1* | 3/2005 | Girouard et al. | 725/136 |
| 2006/0095410 A1* | 5/2006 | Ostrover | H04N 7/163 |
| 2008/0256032 A1* | 10/2008 | Vignoli et al. | 707/3 |
| 2013/0051554 A1* | 2/2013 | Braness | H04N 21/2393 380/200 |
| 2013/0339500 A1* | 12/2013 | Antonov | H04L 47/2416 709/223 |

FOREIGN PATENT DOCUMENTS

| | | |
|---|---|---|
| KR | 10-2009-033750 A | 4/2009 |
| WO | 2007/117613 A2 | 10/2007 |

OTHER PUBLICATIONS

J. Ulm and G. White, "Reclaiming Control of the Network from Adaptive Bit Rate Video Clients", National Cable and Telecommunications Association (NCTA), 2012 Spring Technical Forum Proceedings, Boston, Massachusetts (May 2012).

Motorola Mobility, Inc.,"White Paper: Over-the-Top (OTT) Distribution and Protection of Premium Content with SecureMedia's Encryptonite ONE™ HLS+ Solution", Apr. 2011.

Official Action RE: Korean Application No. 10-2014-0041485, dated Oct. 19, 2015.

Official Action, RE: Korean Application No. 10-2014-41485, dated Mar. 9, 2015.

Official Action, RE: Korean Application No. 10-2014-0041485, dated Feb. 15, 2016.

Official Action, Re: Mexican Application No. MX/a/2014/004197, dated Jan. 20, 2016.

Official Action, Re: Mexican Application No. MX/2016/018061, dated May 11, 2016.

Official Action, Re: Canadian Application No. 2,848,262, dated Aug. 6, 2015.

Official Action, Re: Canadian Application No. 2,848,262, dated Jul. 25, 2016.

Official Action, Re: Korean Application No. 10-2014-41485, dated Jul. 25, 2016.

Official Action, Re: Mexican Application No. MX/a/2014/004197, dated Nov. 25, 2016.

Official Action, Re: Mexican Application No. MX/a/2014/004197, dated Jun. 14, 2017.

* cited by examiner

FILTERING CONTENT FOR ADAPTIVE STREAMING

BACKGROUND

Traditional television and the Internet are both used to deliver audio/video (AV) content, such as entertainment and educational programs, to viewers. Television programming and other AV content is available not only from traditional sources like broadcast and cable television, but also from computers and mobile computing devices such as smart phones, tablets and portable computers. These devices may receive content via wired or wireless communications networks, in a home, business, or elsewhere.

Adaptive streaming, also known as adaptive bit rate (ABR) streaming, is a delivery method for streaming video over Internet Protocol (IP). ABR streaming is conventionally based on a series of short Hypertext Transfer Protocol (HTTP) progressive downloads which is applicable to the delivery of both live and on demand content. Examples of ABR streaming protocols include HTTP Live Streaming (HLS), MPEG Dynamic Adaptive Streaming over HTTP (DASH), Microsoft Smooth Streaming, Adobe HTTP Dynamic Streaming (HDS), and the like. An ABR streaming client performs the media download as a series of very small files. The content is cut into many small segments (chunks) and encoded into the desired formats. A chunk is a small file containing a short video segment (typically 2 to 10 seconds) along with associated audio and other data. Adaptive streaming relies generally on the use of HTTP as the transport protocol for these video chunks; however, other protocols may be used as well (e.g., Real Time Messaging Protocol (RTMP) is used in HDS).

Playback is enabled by creating a playlist or manifest that includes a series of uniform resource identifiers (URIs). For example, a uniform resource locator (URL) is a species of URI. Each URI is usable by the client to request a single HTTP chunk. A server, such as the origin server 5, stores several chunk sizes for each segment in time. The client predicts the available bandwidth and requests the best chunk size using the appropriate URI. Since the client is controlling when the content is requested, this is seen as a client-pull mechanism, compared to traditional streaming where the server pushes the content. Using URIs to create the playlist enables very simple client devices using web browser-type interfaces.

Adaptive streaming was developed for video distribution over the Internet, and has long been used (e.g., by Internet video service providers such as Netflix, Hulu, YouTube, and the like) to stream AV content, such as video content embedded in a web site, to an ABR streaming client upon request. The ABR client receives the AV content for display to a user. In order to deal with unpredictable network performance characteristics typical of Internet use, ABR streaming includes the ability to switch between different encodings of the same content. Depending upon available bandwidth, an ABR streaming client can choose an optimum encoding.

A number of multiple service operators (MSOs), such as cable and broadband service providers who provide both cable and Internet services to subscribers, operate content delivery networks (CDNs) in which Internet Protocol (IP) is used for delivery of television programs (i.e., IPTV) over a digital packet-switched network. In some IPTV networks, adaptive bit rate streaming can be used for delivery of AV content, such as live or linear television programming and video on demand (VOD) content.

In much of the AV content that is commercially available, captioning data is included; e.g., closed caption signals that are used to display text associated with spoken words in a program, generally at the bottom of a television screen. Captioning data is provided as part of most broadcast, cable and satellite programming, including advertisements.

Various tools are available to consumers who desire to limit or block AV content that they find objectionable; for example, many parents desire to limit or block AV content consumed by their children, in an effort to better mitigate their children's exposure to objectionable content, namely violence, sexual situations, indecent or suggestive language and the like. Some AV content is marked with a rating that indicates appropriateness for children; however, not all AV content is rated. Typical examples of unrated content include advertising content, and content that is not professionally produced. Captioning data has also been used in tools for parental control, and can be useful in determining whether AV content associated with the captioning data is objectionable.

DETAILED DESCRIPTION

It will be appreciated that the systems depicted and described herein are illustrative examples, and embodiments can be implemented in numerous types of audio/video content delivery networks and systems.

Figure 1:
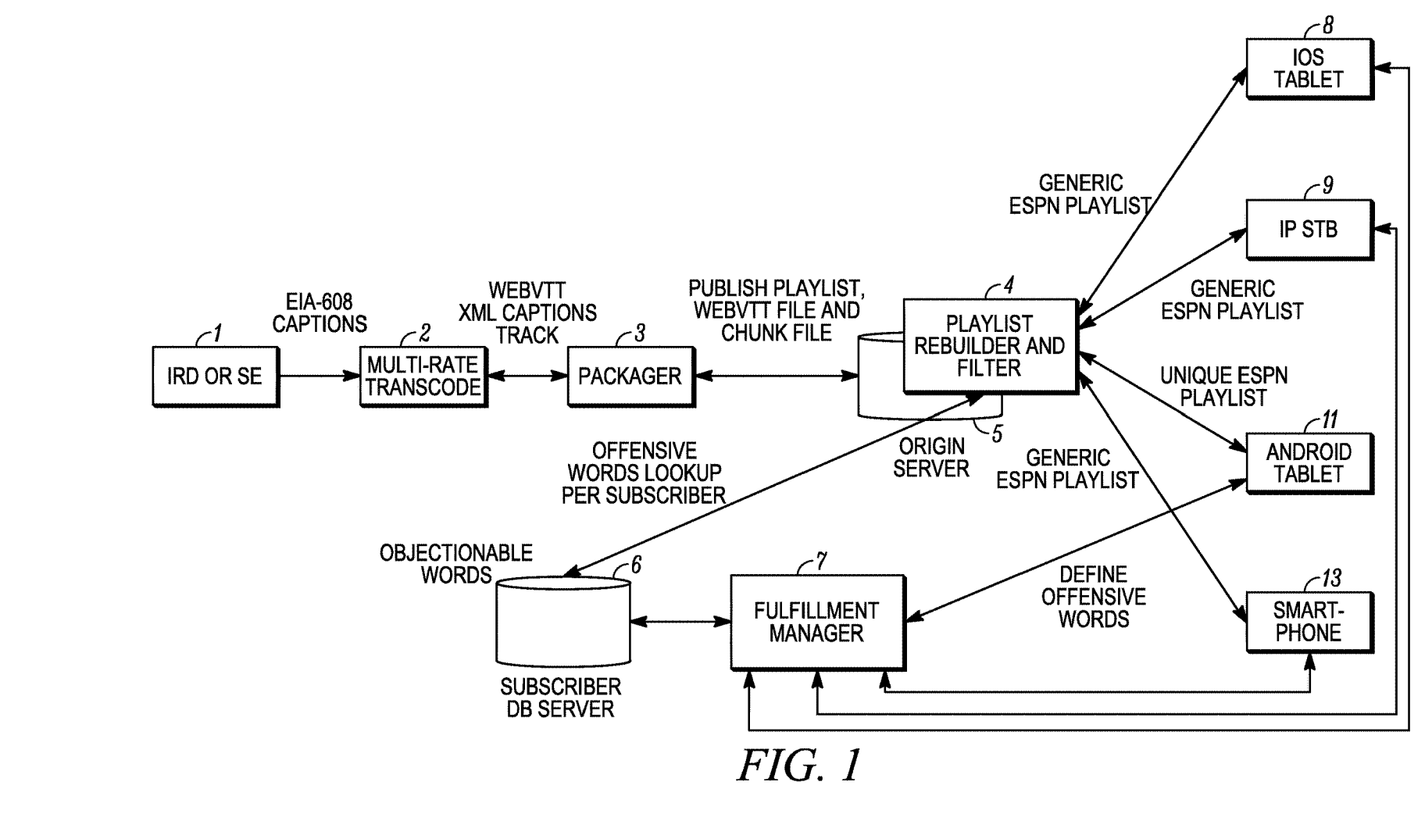
FIG. 1 is a block schematic diagram of a system for filtering AV content for adaptive streaming, in accordance with an embodiment.

FIG. 1 depicts an illustrative example of a system for filtering AV content for adaptive streaming, in accordance with a first embodiment. One or more devices are communicatively coupled to a content delivery network (CDN), and are deployed, for example, in a headend or hub of a cable system operator to perform functions of a multi-rate transcoder 2, a packager 3, an origin server 5, a database server 6, and/or a fulfillment manager 7. The fulfillment manager 7 and the origin server 5 are each communicatively coupled to the content delivery network, and are able to communicate with each other via the network. The origin server 5 in turn connects over the network to one or more AV content sources.

Embodiments such as the example depicted in FIG. 1 are directed primarily to delivery of linear television. "Linear television" refers generally to traditional television programming that is delivered substantially simultaneously to numerous viewers in a service area, e.g., at a scheduled time and on a particular channel. For example, the origin server 5 may receive AV content originating from a content provider such as a cable or network broadcaster (e.g., ESPN, NBC, Fox, CNN, and the like). In some embodiments, the origin server 5 delivers portions of the AV content downstream to edge servers (not shown), where replicated AV content can be cached closer to client devices.

A client device communicates over the content delivery network to receive the AV content. The client device, in a typical embodiment, is a consumer electronics device that is able to render, display, or store AV content. A conventional example would be a television, or a set-top box (STB) such as IP STB 9 that is connectable to a television, controllable by a user interface device (such as a remote control, or a mobile computing device running a remote control application). Further examples of a client device would be a general purpose computer (e.g., a desktop or laptop computer), mobile computing device, tablet (e.g., iOS tablet 8, Android tablet 11), smartphone 13, or any other device able to access audio/video content over the Internet such as modern game consoles, digital video recorders (DVRs), wearable display devices, and numerous other Internet-enabled devices. In some embodiments, an adaptive bit rate streaming client may be included or implemented in a software application, for example, in an Internet browser such as Google Chrome or Internet Explorer, running on any computing device connectable to the content delivery network.

In an embodiment, a user or subscriber may be able to access the content delivery network from more than one client device, and at any number of locations. The client devices associated with a user or a subscriber may thus include, in an illustrative example, a STB 9 and a smartphone 13, both of which may access the system at the same time.

In the illustrated embodiment, the fulfillment manager 7 enables AV content delivery to the client device, e.g., using HTTP for stateless operation. The fulfillment manager 7 is provided generally to receive and fulfill requests from client devices, which (in the context of linear television) may include providing a channel listing to a client during a registration process.

In further embodiments, e.g., in embodiments implemented using legacy system architectures, a session manager device may be provided (e.g., in a headend) to control communication sessions; for example, to set up and tear down communication sessions between a headend and a client device, and to maintain a session state for each communication session. In still further embodiments, the fulfillment manager 7 may be used as an intermediary to process user requests to the session manager. For example, the session manager may accept a request directly from an STB 9, and may accept requests from other types of client devices from a proxy such as a fulfillment manager 7. It will be appreciated that various functions discussed herein (e.g., functions of a session manager or fulfillment manager) may be implemented through software or firmware and thus the term "session manager" or "fulfillment manager" does not necessarily include a separate piece of hardware.

The content delivery network may take many forms, including an optical fiber network or coaxial cable network, a hybrid fiber-coaxial (HFC) network, and may, for example, include communication links to the Internet and/or satellite links.

The origin server 5 may include a storage device where AV content resides, or may be communicatively linked to such storage devices; in either case, the origin server is a location from which the content can be accessed by the client. The origin server 5 may be deployed in a headend or hub. In some embodiments, the origin server 5 responds to the client device and/or to the fulfillment manager 7, e.g., to deliver content requested by the client device. For example, in some embodiments, cable companies provide certain program selections on demand, that is, separate from scheduled transmissions. In further embodiments, the origin server 5 accesses linear programming, e.g., live programming or cable TV channel feeds.

In an illustrative example with respect to linear television, an encoder 1 (e.g., a standalone encoder (SE), an integrated receiver/decoder (IRD), a high definition (HD) encoder, a multi-channel encoder (MCE), a transcoder, a multi-channel transcoder, and the like) receives or ingests AV content, such as satellite, broadcast, or cable content, and encodes the AV content for transmission over a content delivery network. The AV content that is received by the encoder 1, and the encoded AV content that is provided by the encoder 1, can include captioning data; for example, open captions, closed captions (CC), subtitles, EIA-608 captions, CEA-708 captions, and other types of captioning data.

In an embodiment, adaptive bit rate streaming capability is provided in a transcoder 2, for example, a multi-rate transcoder, together with a packager 3. In an illustrative network environment, for example, adaptive streaming can provide enhanced performance in delivering AV content under network traffic constraints that may at times occur. In an embodiment, the transcoder 2 generates a plurality of synchronized transport streams of AV content from a single input transport stream carrying the AV content, such that all of the streams have GOP-aligned frames (where "GOP" means "group of pictures") and synchronized time bases (e.g., program clock reference (PCRs)). The packager 3, in an embodiment, fragments AV content—for example, streams carrying AV content that are received from transcoder 2—into "chunks," which are segments (e.g., 2-10 seconds in duration) of the AV content, and generates playlists for the chunks. In some embodiments, associated captioning data, if any, can be encoded within each chunk, and in further embodiments, the associated captioning data, if any, can be stored for each chunk in a file external to the chunk. The chunks may have differing resolutions. For example, although the program may be available in high definition (HD), chunks can also be provided in a lower resolution, and such lower resolution chunks can be selected from a playlist by a client, e.g., due to bandwidth constraints. The term "playlist," as used herein, encompasses, for example, an HLS playlist or manifest, Media Presentation Description (MPD), Adobe FMF, and other single or fragmented files and data structures for providing access (e.g., by lists of URL addresses) of chunks in ABR streaming.

The transcoder 2 and packager 3 together thus provides chunks in multiple resolutions or otherwise adapted to multiple bit rates or protocols, and the transcoder 2 and packager 3 can provide the chunks with their associated captioning data (e.g., a captions track, which may follow the WebVTT protocol for rendering captioning data on screen). In an embodiment, each chunk can include, or can be associated with, a WebVTT file. The chunks are assembled by a packager 3 which then publishes a playlist (i.e., a generic playlist) of the chunks, e.g., by sending the playlist, with the chunks and their associated WebVTT files, to the origin server 5. In an embodiment, for each time period corresponding to a chunk, the playlist offers a plurality of available versions of each chunk for retrieval; for example, the version of a chunk corresponding to a particular bit rate may be selected by the client in response to network bandwidth constraints.

Captioning data may be a reliable indicator for determining the objectionable nature of a portion or segment of the AV content in which the captioning data appears. For example, if closed caption text includes objectionable language, the content of the program that is proximate in time to such language is likely to be objectionable. Captioning data also may be a reliable indicator for determining whether the overall content of an entire program is objectionable; for example, if closed caption text includes objectionable language, the content of the program as a whole may also be objectionable.

Client devices, which may include, for example, a computer or mobile computing device (e.g., an iOS tablet 8, an Android tablet 11, a smartphone 13), an Internet Protocol (IP) set-top box (STB) 9, an Internet-capable television or other Internet-capable display device, and other types and forms of client computing devices, are able to communicate, wired or wirelessly, with the origin server 5 via the network, for delivery of AV content to the respective client devices. In each case, the program can be delivered to the client device in chunks (e.g., chunks retrievable from the origin server 5 or from other locations), based upon the client requesting successive chunks from a location specified for each chunk in a playlist (e.g., a generic playlist of chunks retrieved from the origin server 5). In an embodiment, for each time period corresponding to a chunk, the client selects among a plurality of available versions of each chunk for retrieval; for example, the version of a chunk corresponding to a particular bit rate may be selected by the client in response to network bandwidth constraints.

In the illustrated example, the case of the Android tablet 11 is used to illustrate features of an embodiment. Such features can be provided, in this embodiment, to any of the client devices; however, in the depicted example shown in FIG. 1, only tablet 11 receives a filtered playlist (e.g., a personalized, customized, or unique playlist) rather than the generic playlist. In this case, for example, a user or subscriber associated with tablet 11 has been provided with a service (e.g., based upon a subscriber request) that allows the subscriber to define a personalized rule set for filtering AV content.

In an embodiment, the fulfillment manager 7 can be used by a client device to establish or modify a personalized rule set. The personalized rule set can be associated, for example, with the subscriber, the subscriber's household or business, the client device, or the user of the client device. The personalized rule set can be used by the system to filter corresponding objectionable content from the AV content to be delivered to the associated client device, tablet 11.

The personalized rule set, in an illustrative example, includes data identifying a selection of objectionable content to be filtered (e.g., by using words, terms, phrases, categories, or other indicia of offensive language or text that may indicate objectionable content). For example, through a user interface (not shown), the user or subscriber may be able to enter or select key words and/or phrases deemed to indicate objectionable content.

The personalized rule set is transmitted, in an embodiment, to a filter (e.g., a filtering device or service). In some embodiments, the filter is included in the origin server 5, e.g., in a playlist rebuilder and filter 4 of the origin server 5.

In other embodiments, the filter can be included in a fulfillment manager 7. Fulfillment manager 7 is provided to fulfill (or, if appropriate, to deny) requests for AV content made by the client 11 over the network. In some embodiments, the filter, filtering service, or filtering device can be included or implemented in one of the session manager, the client device, or can be embodied in resident software in any server or device that provides program menus and executes program requests. In an embodiment, the filter is also able to store and retrieve the personalized rule set, e.g., in a database 6 (such as a Subscriber Database (DB) Server). The database 6 is coupled to the network, e.g., via the network to the origin server 5.

In the depicted embodiment, origin server 5 includes the filter in a combined playlist rebuilder and filter 4. For example, the filter is able to retrieve the personalized rule set corresponding to the client device from the database 6, and apply rules of the personalized rule set on a chunk-by-chunk basis to the generic playlist. For example, an embodiment of the filter can use a selected rule to identify objectionable terms (e.g., words, phrases, and the like), and can compare the objectionable terms with captioning data associated with a selected chunk (e.g., in WebVTT files associated with one or more chunks) to evaluate whether the chunk is in compliance with, or in violation of, the one or more rules of the personalized rule set. Based upon the chunk-by-chunk evaluation, the playlist rebuilder 4 is able to generate a filtered adaptive streaming playlist (e.g., by rebuilding or modifying the generic playlist) so that chunks which are not in compliance with the personalized rule set (e.g., chunks that include identified objectionable terms) are blocked. The playlist rebuilder 4 thus makes a new filtered playlist which contains only acceptable AV content, in accordance with the personalized rule set. The term "blocked," as used herein, means that the AV content in a chunk that is non-compliant with the personalized rule set (e.g., a chunk containing offensive language) is in some way rendered imperceptible to the user of the client device. For example, in some embodiments, the AV content of the chunk may be distorted in either video, audio, and/or captioning display. In further embodiments, such chunks may be dropped completely (e.g., omitted) from the filtered playlist, may have substitute or alternate chunks inserted in their place in the filtered playlist, may be scrambled, or may be otherwise made unavailable for successful rendering by the client. As an example, one or more chunks containing advertising content could be substituted for one or more chunks that are non-compliant with the personalized rule set. The result, as depicted in the example, is that the client device (here, tablet 11) receives a filtered adaptive streaming playlist for AV content comprising chunks in which the offensive subject matter has been eliminated.

In the context of linear programming, the adaptive streaming playlist, whether generic or filtered, changes periodically over time (e.g., as linear AV content is received by the origin server). Accordingly, the playlist must be periodically updated or refreshed in the client device. The playlist, as delivered to the client device at any given time, provides a sliding window of available content; e.g., the playlist provides URIs for chunks that are available (or are expected to be available) during a window of time that includes a period substantially contemporaneous with delivery of the playlist to the client, and extending backward for a first period of time, and forward for a second period of time during which the playlist remains usable. Thus, in order to continue uninterrupted viewing of linear AV content in an embodiment, the client device must obtain an updated playlist prior to the end of the second period of time.

Figure 2:
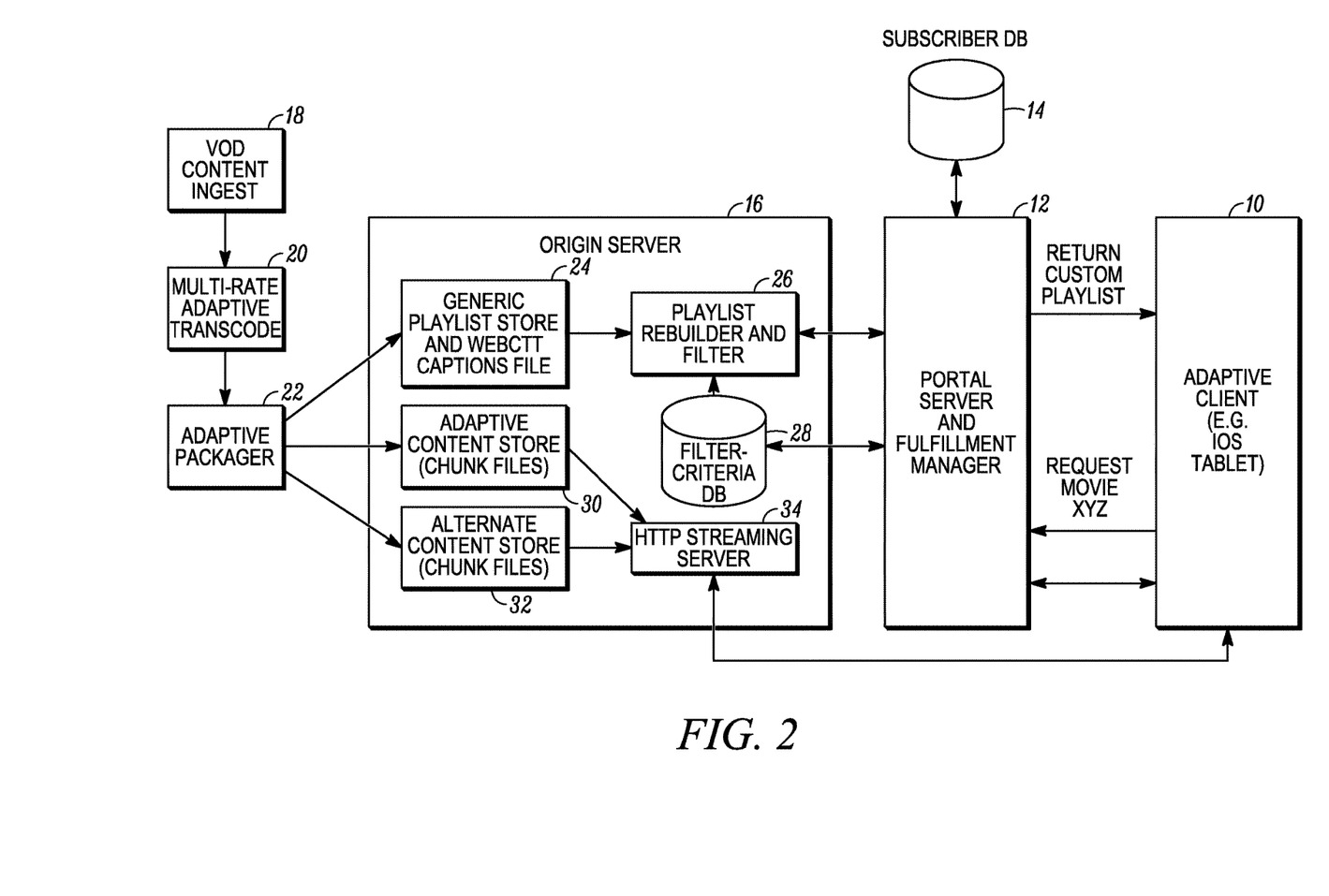
FIG. 2 is a block schematic diagram of a system for filtering AV content for adaptive streaming of VOD content, in accordance with an embodiment.

Referring to FIG. 2, which shows a system for providing AV content comprising video-on-demand (VOD) content, in accordance with a second embodiment, an adaptive client 10 is in communication with a session manager such as the depicted portal server and fulfillment manager (PSFM) 12.

VOD content is supplied by a VOD content server 18 of the cable provider or of a third party. The AV content supplied by the VOD content server 18 is broken into "chunks" of AV data by a multi-rate adaptive transcoder 20. Each chunk of AV data has a unique URL which enables it to be separately identified. These URLs will be collected to form a playlist as will be explained below. The transcoder 20 also extracts from the AV data closed caption information in the form of WebVTT captions files. The output of the transcoder 20 is provided to an adaptive packager 22 which arranges the AV chunks into a program, such that each program is a collection of chunks. Programs will have different versions of chunk collections for the same program, e.g., with differing resolutions. In some embodiments, chunks can be provided, when desired, with substitute content or altered content. Available bandwidth may dictate which chunks are used to compile a program suitable for streaming.

As in the previously discussed embodiments, the client device 10 can be a tablet such as an iPad, a smartphone, or a TV or computer that is capable of communicatively coupling to the content delivery network. The PSFM 12 can be included or implemented (e.g., as an application or service) within the client 10, or in any of numerous devices in wired or wireless communication with the client 10, such as a cable/dish TV set-top box, an Internet connected DVD player or the like, or in a computer, tablet, smartphone or other mobile computing device that is capable of providing content menus and managing requests for the delivery of AV content to the client 10. The PSFM 12 is in communication with a subscriber database 14 so that the client 10 can be verified as a valid subscriber to the AV content provided by the PSFM 12.

In an illustrative example, a client 10 communicates with the fulfillment manager of the PSFM 12 to request a specified movie "XYZ." In an embodiment, the PSFM 12 will build, and will return to the client 10, a URL for accessing a resource in a stateless fashion (e.g., a RESTful URL in accordance with Representational State Transfer (REST) principles). In this case, the RESTful URL is a URL that includes all of the information required by a playlist rebuilder (PLR) and filter 26 to generate a unique playlist or manifest for the client 10 to receive the specified movie. Accordingly, in an embodiment, the URL returned would have type/value pairs indicating that the AV content that should be received by this client 10 should be, for example, DRM protected (e.g., using SecureMedia HLS+), should be delivered using a particular protocol (e.g., HLS), is for a certain advertising region, and whether the AV content is to be filtered.

In an illustrative example, the client 10 does an HTTP request, via the CDN, for a .m3u8 (HLS) playlist file name embedded in the URL. The request will be directed to a local edge cache server (not shown), e.g., a transparent cache. If the file is not there, the transparent cache will forward the request to the origin server 16, which in turn, will recognize that the request should be directed to the PLR 26. If the PLR 26 is embedded in the origin server 16, the origin server 16's HTTP web server can engage the PLR 26 directly. If the PLR 26 is not embedded, the origin server 16 might forward the request to the PLR 26 (e.g., using common gateway interface (CGI)). Ultimately, the PLR 26 will receive the type/value data embedded in the URL, which provides enough information for the PLR 26 to determine that it needs to generate a custom (filtered) playlist, and to obtain the corresponding personalized rule set (e.g., identifying objectionable content) for chunk filtering, and therefore, the PLR 26 will be able to determine what chunks to reference in the playlist being built uniquely for that client 10.

The AV chunks are transmitted to an origin server 16. The origin server 16 includes components which build a custom playlist from the collections of chunks. Since each chunk of AV data has a unique URI, the custom playlist can be a collection of URIs that make up the complete program. The custom playlist, as will be explained herein, may omit or alter chunks that contain AV content that is not in compliance with a rule set applied by the filter, e.g., non-compliant AV content that is deemed objectionable in a personalized rule set.

In an embodiment, a generic playlist store 24 holds a generic playlist together with WebVTT files essentially as sent from the adaptive packager 22. The WebVTT files are scanned and filtered using a filter criteria database 28 which has stored within it one or more rule sets, such as a personalized rule set applicable to the client device, user, or subscriber. In an embodiment, the personalized rule set can include, for example, a list of words and phrases deemed objectionable or offensive by a user of a client 10. As a result, a playlist rebuilder and filter (PLR) 26 assembles a custom playlist in which AV chunks containing objectionable or offensive subject matter are to be blocked. The term "blocked" in this context may mean that the chunks are eliminated, or distorted in some way, or the captioning data is stripped away. In an embodiment directed to VOD content, unlike the linear television embodiments discussed above, the PLR 26 builds a whole playlist—not a periodically updated playlist for providing a sliding window of temporarily available linear AV content—and delivers the whole playlist to the client 10; e.g., a larger playlist for the entire duration of the VOD content. For example, the custom playlist is sent by the PLR 26 to the PSFM 12 which in turn transmits it to the client 10.

The filter criteria database 28 is provided to store filter criteria data such as rule sets, such as a personalized rule set applicable to a client device, user, or subscriber. In an embodiment, the filter criteria data (or one or more of the rule sets) can include, for example, a list of words and phrases, or a category associated with selected words and phrases. In a further embodiment, such words and phrases may be entered or selected by a user of a client 10 communicating by way of an external keyboard or the like (not shown) coupled to the client 10. In further embodiments, the database 28 may include rules, rule sets, lists, or other filtering criteria. Such rules, rule sets, lists, or other filtering criteria may, in various embodiments, be created, specified, or selected by a user or subscriber, by an MSO, or by a third party. In some embodiments, such rules, rule sets, lists, or other filtering criteria may be provided in accordance with a third party standard (such as a community standard, a regulatory standard, an industry guideline, a standard provided by a non-profit or religious organization, and the like).

Chunk files contain the actual AV data and those files are provided to the origin server 16 by the adaptive packager 22. For any given program, there may be two types of chunk files generated. The first is the unaltered program content, which is stored in the adaptive content store 30. The second is stored in an alternate content store 32. The chunk files in store 32 may be files that are distorted in some way so as to provide blockage of objectionable content. These files otherwise mirror the chunk files in adaptive content store 30 so that when a substitution is called for, the alternate files are inserted in the place of the original chunk files.

Both sets of chunk files from stores 30 and 32 are provided to the HTTP streaming server 34. Appropriate ones of these chunk files are fetched by the client 10 according to the custom playlist returned to the client after filtering by the playlist rebuilder and filter 26. Thus the program provided by the server 34 may be a combination of chunk files, some of them original chunks, and some of them altered to block offensive material. The alternate chunk files could be any AV content that omits the objectionable matter from the original.

These files could thus contain alternate words and phrases, scrambled video, black screens, muted audio and/or advertising.

In an illustrative example of an embodiment directed to VOD content, the client 10 will send a request to the fulfillment manager of PSFM 12 for a desired VOD content; for example, a request that will present an Asset ID (e.g. for the movie Titanic) and a Device ID (e.g., identifying the client 10). The fulfillment manager of PSFM 12 can relate the Device ID to the subscriber, the attributes of the particular device, current authorizations, etc. The fulfillment manager of PSFM 12 will then intelligently redirect the request; for example, by returning a URL that the client 10 can use on the network to request the VOD content. The URL built by the fulfillment manager of PSFM 12, and given to the client 10, will contain all the information needed to retrieve the movie (the m3u8 file), i.e., a RESTful URL. If the URL is for the generic playlist or manifest, then a single URL request is needed. If the client 10 has requested filtering, then another URL will be returned; one that directs the client to the PLR 26 (which can be embedded within the origin server 16, or can be reachable via common gateway interface). The URL will provide enough information to instruct the PLR 26 to obtain the personalized rule set associated with client 10, and to rebuild the generic playlist or manifest such that problematic chunks are dropped or replaced. The updated and rebuilt playlist gets returned to the client 10 in response to the client's initial HTTP request, thus enabling the client 10 to begin downloading chunk files.

Figure 3:
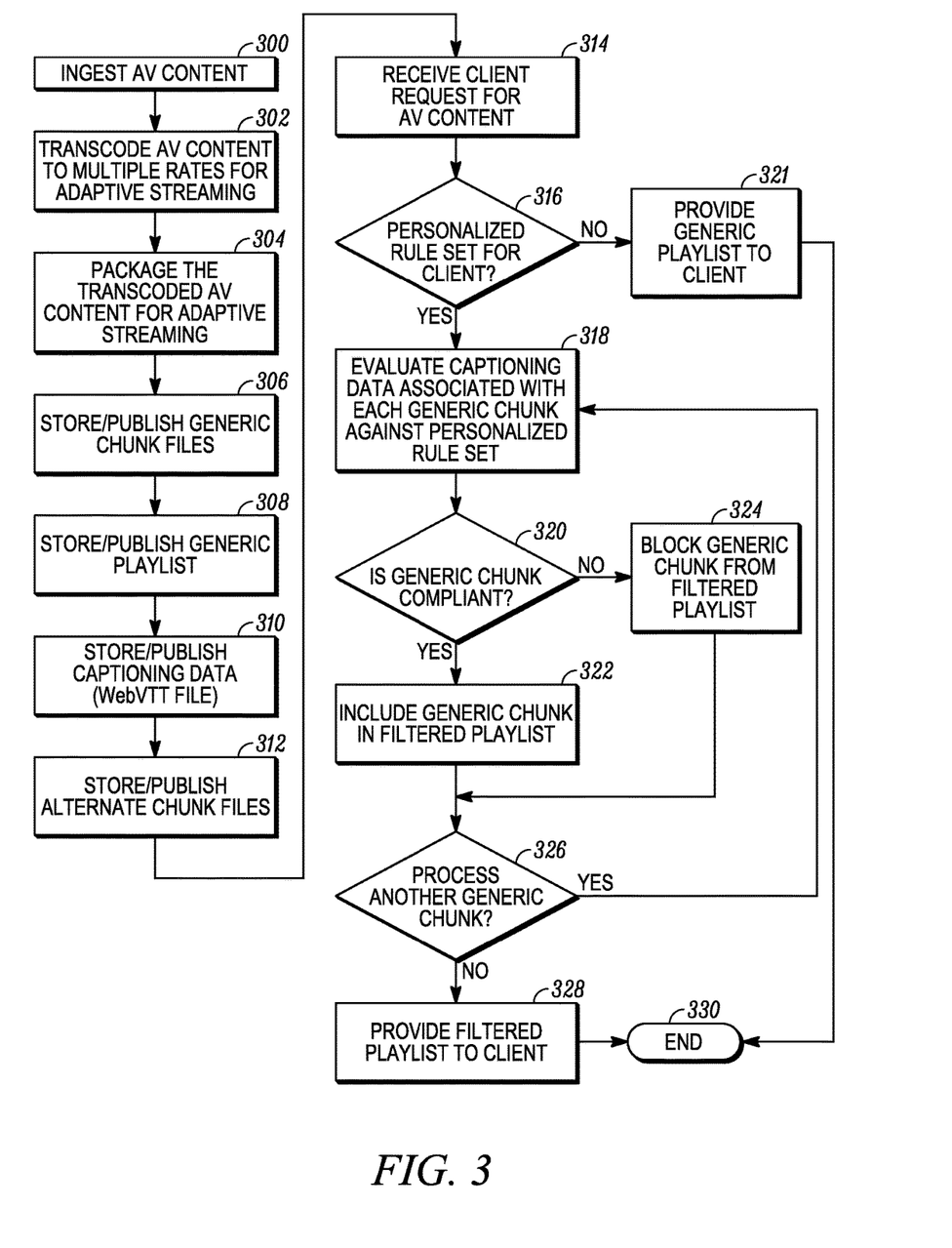
FIG. 3 is a logical flow chart diagram illustrating the operation of a system for filtering AV content for adaptive streaming, in accordance with an embodiment.

An example of a method for operation of the system of FIG. 2, in accordance with an embodiment, is illustrated by the flow chart diagram of FIG. 3.

Referring to FIG. 3, AV content is provided to a network by a third party provider (block 300). This content is adapted to streaming content by a transcoder into files that can be delivered at multiple rates (block 302). The AV files are assembled into a package of chunks which can be streamed over the network (block 304). The package of chunks is then stored or published as a generic collection of chunk files (block 306). Whether the package is stored or published may depend upon whether the AV content is live, as in a sports broadcast or network TV broadcast, or is VOD content. A playlist is assembled from this package of chunk files which is deemed a generic playlist, that is, one that has not been filtered for objectionable content. The playlist is then stored or published (block 308).

Next, captioning data, typically in the form of a WebVTT file, is generated from captioning data files provided with VOD content or embedded within the linear content (e.g., EIA-608) and either stored or published (block 310). In an embodiment, WebVTT chunk files will be created by transcoder 2, or by a post processor such as packager 3, such that they are aligned with the content chunk files. Accordingly, embodiments will readily be able to evaluate the WebVTT chunk files in connection with their corresponding AV content chunk files.

In some embodiments, alternate chunk files that mirror the chunk files stored or published at block 306 are then generated (block 312). These alternate chunk files can be used as substitutes for their corresponding chunk files in the generic playlist if objectionable content is discovered. The content thus prepared is accessed upon a client request (block 314). This action triggers a query as to whether the client has provided a personalized rule set (decision node 316). In this context, a personalized rule set may, for example, refer to a list entered by the client, to a standardized list selected by the client, and the like.

In an embodiment, at this step, a filtering device determines whether the client device (or, for example, a user or subscriber associated with the client device) has enabled a rule set (e.g., a content blocking feature) and then obtains or imports whichever rule set (e.g., an objectionable word/phrase list) the client has selected. For example, in an embodiment, the filtering device obtains the personalized rule set by sending a rule set query, via the content delivery network, to a database server communicatively coupled to the content delivery network, and the rule set query includes an identification, e.g., of the client device, or of a user, subscriber, or household associated with the client device. The database server stores a plurality of rule sets and associates a stored rule set with one or more corresponding client devices. In response to the rule set query, the database server returns a message to the filtering device that includes the stored personalized rule set corresponding to the identification in the query.

If, at decision node 316, there is a "no," the generic playlist is provided to the client (block 321) and the generic chunk files are rendered (oval 330). If decision node 316 is "yes," the captioning data in each generic chunk is compared against the personalized rule set (block 318). It will be understood that for a chunk corresponding to a particular time period within the AV content, a plurality of versions of the chunk may be available (e.g., encoded at different bit rates), and an embodiment does not need to assess each such version of the particular chunk against the personalized rule set, but may instead rely upon an assumption that each such version of the particular chunk contains materially identical content, because each version of the chunk corresponds to the same period of time within the selected AV content. Accordingly, in an embodiment, the filtering device can determine whether all versions of the particular chunk are in compliance with the one or more rules of the personalized rule set, by checking whether any one of the versions of the chunk is in compliance with the one or more rules of the personalized rule set.

If at decision node 320 the generic chunk under examination is compliant with the rule set, that chunk is included in a playlist, now deemed a "filtered playlist" (block 322). If, however, the generic chunk under examination is in non-compliant with the rule set (e.g., certain captioning data matches objectionable words or phrases in the personalized rule set), decision node 316 is "no." The result is that that chunk is blocked and will not be included in the filtered playlist. Instead an alternate chunk as described above will be substituted in its place (block 324); in another embodiment, the chunk is omitted from the filtered playlist without substitution of an alternate chunk.

At decision node 326 a determination is made as to whether all chunks in the program have been processed or otherwise taken into account. If the chunk processed is not the last one, the process is repeated until all chunks have been examined. When this process has finished, decision node 326 will be "no." The step at block 328 is then executed which is to assemble a filtered playlist which is then returned to the client and the process is at an end (oval 330).

It will be understood and appreciated that there are many equivalents to the embodiments disclosed herein and that modifications and variations may be made without departing from the scope and spirit of the invention, which are to be limited not by the embodiments but by the appended claims, including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A system, in a content delivery network, for adaptive streaming playlist filtering, the system comprising:
   an origin server, communicatively coupled to the content delivery network, and configured for receiving a first adaptive streaming playlist from a packager communicatively coupled to the content delivery network, wherein the first adaptive streaming playlist is for delivery of a plurality of stored chunks of a selected audio/video (AV) content to an adaptive streaming client in a client device, the first adaptive streaming playlist comprising retrieval information corresponding to a first plurality of stored chunks of the selected AV content;
   a filtering device, communicatively coupled to the content delivery network, configured for using retrieval information in the first adaptive streaming playlist, wherein the retrieval information corresponds to a chunk of the selected AV content, for applying one or more rules of a personalized rule set associated with the client device to captioning data associated and aligned with the chunk of the selected AV content and external to the chunk of the selected AV content, to determine whether the chunk is in compliance with the personalized rule set;
      wherein the filtering device is further configured to determine for a plurality of versions of the chunk, each version of the chunk corresponding to a same period of time within the selected AV content, whether all versions of the chunk are in compliance with the one or more rules of the personalized rule set, based upon whether the chunk is in compliance with the one or more rules of the personalized rule set;
   a playlist rebuilder, communicatively coupled to the content delivery network, and responsive to the filtering device for assembling a filtered adaptive streaming playlist,
      wherein retrieval information is omitted for chunks that are not in compliance with the personalized rule set and corresponding retrieval information for chunks from an alternate collection of chunks are substituted therefor, and
      wherein the filtered adaptive streaming playlist comprises retrieval information corresponding to a second plurality of stored chunks for the selected AV content, wherein each chunk of the second plurality of stored chunks is in compliance with the personalized rule set;
   the origin server further configured to provide to the adaptive streaming client, via the content delivery network, in response to a request for the selected AV content from the client device, the filtered adaptive streaming playlist in place of the first adaptive streaming playlist, for enabling retrieval by the client device, via the content delivery network, of a filtered rendition of the selected AV content in compliance with the personalized rule set.

2. The system of claim 1 wherein the one or more rules identify objectionable text, and the filtering device compares the objectionable text with captioning data associated with the chunk to determine whether the chunk is in compliance with the one or more rules.

3. The system of claim 1 wherein the filtering device is configured to obtain the personalized rule set by sending a rule set query, via the content delivery network, to a database server communicatively coupled to the content delivery network, the rule set query comprising an identification of the client device.

4. The system of claim 1 further comprising:
   a database server, communicatively coupled to the content delivery network, and configured to store a plurality of rule sets and to associate a stored rule set with one or more corresponding client devices;
   wherein the database server is configured, in response to a rule set query comprising an identification of a selected client device associated with a stored rule set, to return a message comprising the stored rule set.

5. The system of claim 1, further comprising:
   the packager, communicatively coupled to the content delivery network, and configured to publish, via the content delivery network, the first playlist and the first plurality of stored chunks of the AV content.

6. The system of claim 1 wherein the origin server is configured to receive the first playlist, via the content delivery network, from a packager for creating the first playlist.

7. The system of claim 1 wherein the origin server is communicatively coupled, via the content delivery network, to a video-on-demand (VOD) content server.

8. The system of claim 5 wherein the packager, the origin server, and the filtering device are disposed in a headend of a cable service provider and communicatively coupled to the content delivery network.

9. The system of claim 1 wherein objectionable chunks of the first plurality of stored chunks, wherein the objectionable chunks are not in compliance with the personalized rule set, are rendered as distorted or altered such that objectionable content therein is not perceptible.

10. The system of claim 1 wherein the chunks in the generic collection having objectionable content are omitted from the custom playlist.

11. The system of claim 1 wherein the origin server includes a streaming server for providing to the client device a filtered playlist, and for transmitting one or more chunks from a generic collection of chunks and one or more chunks from the alternate collection of chunks to the client device, further wherein each chunk in the alternate collection is in compliance with the personalized rule set.

12. The system of claim 11 wherein the alternate collection of chunks have objectionable content visually blurred.

13. The system of claim 11 wherein the alternate collection of chunks have objectionable audio portions distorted or silenced.

14. The system of claim 11 wherein the alternate collection of chunks have objectionable captioning data omitted or obscured.

15. The system of claim 1 wherein the origin server comprises one or more of the filtering device and the playlist rebuilder.

16. A method of creating a filtered adaptive streaming playlist for delivery of a selected audio/video (AV) content, the method comprising:
receiving, from a packager via a content delivery network, a first adaptive streaming playlist comprising retrieval information for a generic collection of chunks of AV data, each chunk corresponding to a segment of the selected AV content;
receiving a request for the selected AV content, via the content delivery network, from a client device;
using retrieval information in the first adaptive streaming playlist, wherein the retrieval information corresponds to a chunk of the selected AV content, for applying one or more rules of a personalized rule set associated with the client device to captioning data associated and aligned with the chunk of the selected AV content and external to the chunk of the selected AV content, to determine whether the chunk is in compliance with the personalized rule set;
determining for a plurality of versions of the chunk, each version of the chunk corresponding to a same period of time within the selected AV content, whether all versions of the chunk are in compliance with the one or more rules of the personalized rule set, based upon whether the chunk is in compliance with the one or more rules of the personalized rule set;
assembling a filtered adaptive streaming playlist,
wherein retrieval information is omitted for chunks that are not in compliance with the personalized rule set and corresponding retrieval information for chunks from an alternate collection of chunks are substituted therefor, and
wherein the filtered adaptive streaming playlist comprises retrieval information corresponding to a second plurality of stored chunks for the selected AV content, wherein each chunk of the second plurality of stored chunks is in compliance with the personalized rule set;
providing to the client device, in response to the request, the filtered adaptive streaming playlist in place of the first adaptive streaming playlist, for enabling retrieval by an adaptive streaming client, via the content delivery network, of a filtered rendition of the selected AV content in compliance with the personalized rule set.

17. The method of claim 16 wherein the one or more rules identify objectionable text, further comprising:
receiving captioning data corresponding to each chunk of AV data;
comparing the objectionable text with the captioning data associated with the chunk to determine whether the chunk is in compliance with the one or more rules.

18. The method of claim 16 further comprising:
obtaining the personalized rule set by sending a rule set query to a database server, the rule set query comprising an identification of the client device.

19. The method of claim 16 further comprising:
transmitting one or more chunks from a generic collection of chunks and one or more chunks from an alternate content collection of chunks to the client device; providing to the client device the filtered adaptive streaming filtered playlist, wherein retrieval information is omitted for chunks that are not in compliance with the personalized rule set, and corresponding retrieval information for chunks from the alternate collection are substituted therefor, further wherein the chunks in the alternate collection are in compliance with the personalized rule set.

* * * * *